April 12, 1932.  R. ANDERSON  1,853,025
COWLING FASTENER
Filed June 16, 1930
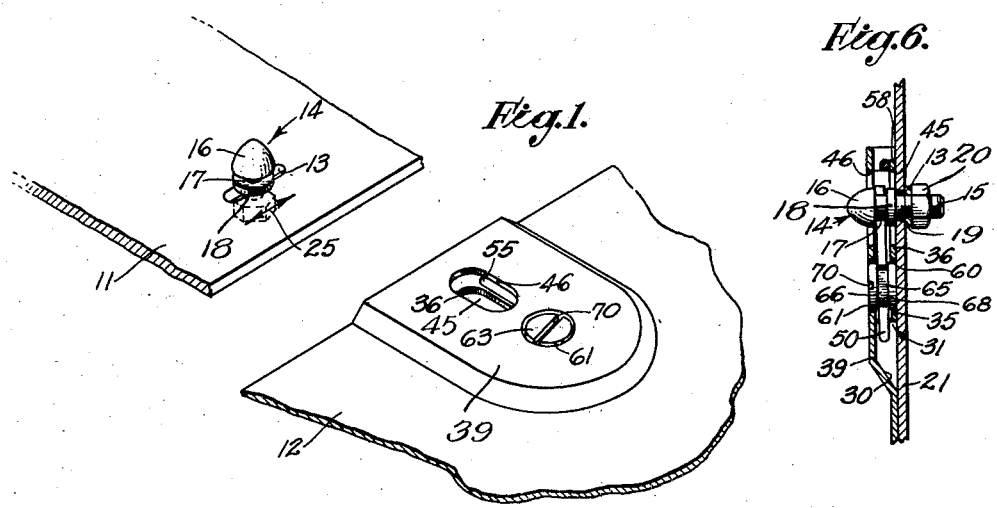
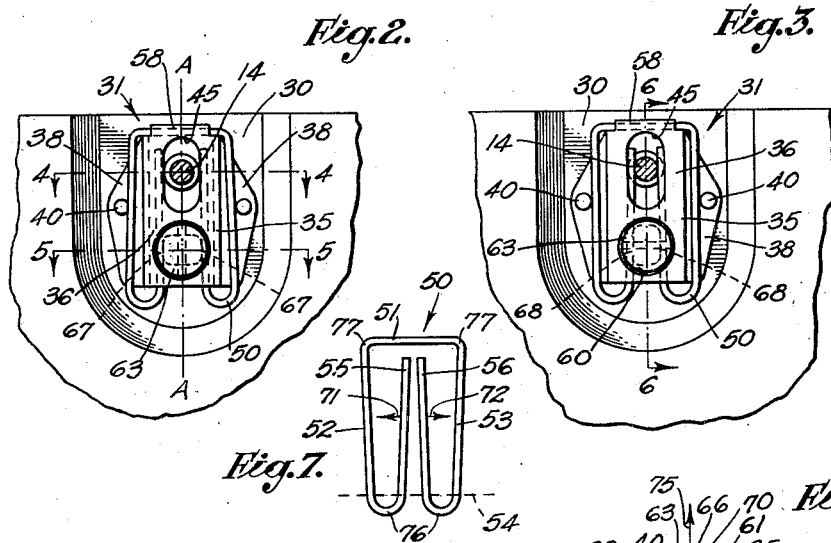
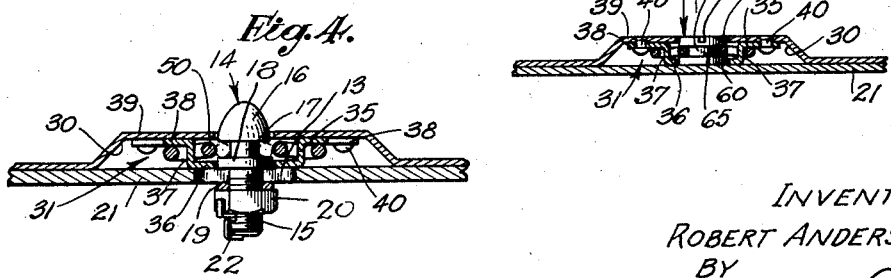
INVENTOR:
ROBERT ANDERSON,
BY
ATTORNEY.

Patented Apr. 12, 1932

1,853,025

UNITED STATES PATENT OFFICE

ROBERT ANDERSON, OF WEST LOS ANGELES, CALIFORNIA, ASSIGNOR TO DOUGLAS AIRCRAFT COMPANY, INC., OF SANTA MONICA, CALIFORNIA, A CORPORATION OF DELAWARE

COWLING FASTENER

Application filed June 16, 1930. Serial No. 461,501.

My invention relates to fastening devices, and is particularly suitable for use in removably securing metal cowling, inspection plates, and the like to the framework or structure of an aeroplane.

It is desirable that the cowling, inspection plates, or other removable portions of the covering of a metal aeroplane be normally securely held in place but be quickly and easily removable when desired.

It is therefore an object of my invention to provide a fastening device which is particularly adapted to fastening metal cowling on an aeroplane, although I do not wish to limit the scope of my invention to utility on aeroplanes as it may be used to advantage in numerous other embodiments.

It is another object of my invention to provide a device of the character described which may be quickly and easily locked or unlocked without the use of special tools.

It is another object of my invention to provide an operable device so designed as to produce a minimum of wind-resistance, when used on an aeroplane.

It is another object of my invention to provide a device of the character described in which the locking mechanism included therein remains in open or closed position until manually operated.

Another object of my invention is to provide a device in which the cooperating parts of the locking mechanism included therein are relatively adjustable.

It is a further object of my invention to provide a locking device of the character mentioned in which the different elements are of novel construction which permit a very simplified, cheap, and economical arrangement of parts, which nevertheless are operative to produce a fastening means which is quite satisfactory for the purpose intended.

It is an object of my invention to provide a locking device of the character mentioned in which the operating means is retained in place solely by the locking arm of the device.

These and other objects will be apparent from a perusal of the following specification, the accompanying drawings, and the appended claims.

Referring to the drawings:

Fig. 1 is a perspective view of a primary and a secondary body supporting individual parts of my invention which are adapted to interlock.

Fig. 2 is a bottom plan view of the locking mechanism of my invention, showing the parts thereof in a mated but unlocked position.

Fig. 3 is a view similar to Fig. 2 but showing the parts of the device in locked position.

Fig. 4 is a sectional view taken as indicated by the line 4—4 of Fig. 2.

Fig. 5 is a sectional view taken as indicated by the line 5—5 of Fig. 2.

Fig. 6 is a sectional view taken as indicated by the line 6—6 of Fig. 3.

Fig. 7 is an elevational view of the locking member of my device.

In Fig. 1 I show a primary body 11 which may be a section of the frame or structure of an aeroplane, and a secondary body 12 which may be a section of a cowling strip or plate covering certain parts of the frame 11. Provided in the primary body 11 is a slot 13 for the adjustable retention of a locking pin generally designated by the numeral 14. The pin 14 is formed with a threaded shank portion 15 and has an enlarged mushroom-shaped knob portion 16 on the upper end. An annular groove 17 is cut in the shank portion 15, thus forming a collar 18, said collar being relatively larger than the threaded portion 15. The threaded portion 15 is adapted to extend through the slot 13 and to receive a friction washer 19 and a nut 20, the nut 20 being operable to clamp the wall 21 of the body 11 between the collar 18 of the pin 14 and the friction washer 19. A locking pin 22 may be used to lock the nut 20 in position as shown in Fig. 4. It will be seen that the locking pin 14 is adjustable in the slot 13 in the directions indicated by the double arrow 25 of Fig. 1.

Referring now to the locking mechanism, details of which are shown in Figs. 2 to 5 inclusive, I provide in the secondary body a shallow U-shaped depression 30 adapted to receive the locking mechanism of the invention, which is generally indicated by the numeral 31. The mechanism 31 is supported within the recess 30 by a lock housing 35 having the form of an open ended rectangular dish comprising a bottom wall 36 and vertical side walls 37, the upper portions of which are bent horizontally outward to form flanges 38. The housing 35 is secured to the wall 39 of the body 12 within the depression 30 by rivets 40. Provided in the bottom wall 36 of the housing 35 is an elongated opening 45 of a sufficient width to receive the knob 16 of the pin 14, this opening being coincident with an opening 46 provided in the wall 39. Both of the openings 45 and 46 are elongated in a direction at right angles to the axis of the slot 13 in the body 11.

The locking means of the invention comprises a spring wire member generally designated by the numeral 50, which may be formed as shown in Fig. 7 by first bending a suitable length of spring wire in the form of an isosceles triangle, having a base 51 and sides 52 and 53. At a suitable point, indicated by the dotted line 54, the sides 52 and 53 are bent in a substantially reverse direction so that the extremities 55 and 56 thereof extend convergently toward the base 51 as shown in Fig. 7.

In positioning the spring member 50 relative to the housing 35, the end portions 55 and 56 are extended within the housing 35 at one end thereof, the sides 52 and 53 being extended along the exterior of the housing and the base portion 51 being positioned in frictional contact with the opposite end thereof under a lip 58 which projects outwardly as an extension of the wall 36.

Provided in the wall 36 of the housing 35 is an opening 60, which is axially aligned with an opening 61 in the wall 39, these openings 60 and 61 being also in alignment relative to the axis A—A as shown in Fig. 2. Positioned within the openings 60 and 61 and conforming closely to the diameter thereof is an operating member 63 which is of such a thickness that the top and bottom surfaces thereof are flush with the outer surfaces of the wall 39 and the wall 36 respectively. Extending entirely around the circumference of the member 63 is a cam groove 65, the bottom of which forms a cam surface 66 providing a pair of diametrically opposite high spots 67, and a pair of diametrically opposite low spots 68 as illustrated by dotted lines in Figs. 2 and 3.

In the upper surface of the member 63 a screw driver slot 70 is provided, which slot is adapted to be engaged by a suitable instrument for the manual rotation of the member 63.

The free end portions 55 and 56 of the spring member 50 are positioned in the groove 65 on opposite sides of the member 63 in frictional contact with the cam surface 66, as shown in Figs. 5 and 6. The member 63 is retained in its proper position due to the strain placed on the end portions 55 and 56, which imparts a force in the direction of the arrow 75 of Fig. 5 to the portions 52 and 53, tending to press these portions against the flanges 38 of the housing member 35.

It will be noted that the operating member or cam member 63 has the pair of bearing faces or bearings which rest in the openings 60 and 61 and thus rotatably support the operating member in place. The operating member is prevented from axial movement from the housing in which it is located through either of the openings 60 or 61 by reason of the fact that one or both of the arms of the spring member 50 extend into the groove 65 and thus prevent the removal of the operating member 63. If it is desired to remove the operating member 63, this may be easily accomplished by spreading the arms of the spring member 50 so that they are moved entirely out of the groove 65.

The operation of my invention is as follows:

With the operating member 63 in the position shown in Fig. 2 so that the free end portions 55 and 56 of the spring 50 are relatively spaced a distance slightly greater than the width of the opening 45, by contact with the high spots 67 of the cam surface 66 the body 12 is positioned over the body 11 in such a manner that the locking pin 14 extends upward through the openings 45 and 46. In this position the annular groove 17 in the pin 14 lies substantially in the same plane as the free end portions 55 and 56 of the spring member, so that upon a rotation of the operating member 63 through 90° in either direction, these end portions will be released to move laterally into the groove 17 in the position shown in Fig. 3, thereby locking the pin 14 against movement. The cooperation of a plurality of similar fastening devices securely locks the body 12 to the body 11.

When it is desired to release the body 12 from engagement with the body 11, the operating member 63 is rotated through 90° in either direction, causing the high spots 67 to force the end portions 55 and 56 of the spring member 50 into the position shown in Fig. 2, permitting the withdrawal of the pin 14 from the openings 45 and 46.

It is an important feature of the invention that when force is applied to the free ends 55 and 56 of the spring 50 in the directions indicated by the arrows 71 and 72 respectively, part of the reflex action occurs at the reverse curved portion 76 and part at the bent portions 77 at the intersection of the base 51 and the side portions 52 and 53. It will be seen from an inspection of Figs. 2 and 3 that this feature permits the end portions 55 and 56 to at all times lie in a position substantially parallel with the cam faces 67 or 68.

A further important feature of my present invention is the details of construction of the operating member 63 and the manner in which it is retained in place. The operating member 63 may be very easily inserted into operating position after the other parts of the device have been assembled. It will be noted that the only securement which is required in the preferred form of my invention, for retaining the operating member 63 in place, is that one or both of the arms of the spring member 50 rest in the groove 65.

A further important feature of my invention is the manner in which the locking pin and the locking device are adjustable relative to each other in order that alignment may be obtained. It will be noted that in Fig. 1 the slot 13 through which the locking pin 14 extends is elongated on an axis which is at right angles to the axis of the opening 45.

Although I have herein described only one complete embodiment of my invention, it should be understood that I am aware that various features thereof might be changed and numerous embodiments thereof might be devised without departing from the spirit and scope of my invention.

I claim as my invention:

1. In a fastening device, the combination of: a primary member having a primary slot formed therein; a fastening pin secured to said primary member and being adjustable in said primary slot; a secondary member having a secondary slot formed therein, said secondary slot being elongated at an angle to the major axis of said primary slot, said fastening pin being adapted to project into said secondary slot; and locking means for locking said fastening pin in said secondary slot.

2. In a fastening device, the combination of: a primary member having a primary slot formed therein; a fastening pin secured to said primary member and being adjustable in said primary slot; a secondary member having a secondary slot formed therein, said secondary slot being elongated at right angles to the major axis of said primary slot, said fastening pin being adapted to project into said secondary slot; and locking means for locking said fastening pin in said secondary slot.

3. In a fastening device, the combination of: walls forming a cavity and an opening through which a fastening pin may be inserted in said cavity; spring means having a spring arm extending adjacent said opening so as to be capable of engaging the fastening pin; and cam means in said cavity and being exposed through an aperture in said walls, said cam means engaging said spring means and being operable to move said arm into non-engaging position, and said cam means being retained in place solely by reason of its engagement with said spring means.

4. In a fastening device, the combination of: walls forming a cavity and an opening through which a fastening pin may be inserted in said cavity; spring means having a spring arm extending adjacent said opening so as to be capable of engaging the fastening pin; and cam means in said cavity and being exposed through an aperture in said walls, said cam means having a groove in which said spring means rests and being operable to move said arm into non-engaging position, and said cam means being retained in place solely by reason of its engagement with said spring means.

5. In a fastening device, the combination of: walls forming a cavity having an opening through which a fastening pin may extend into said cavity and having an aperture; lock means in said cavity having an arm capable of engaging the fastening pin when same is extended in said cavity; and cam means extending through said aperture and into said cavity, said cam means having a cam groove formed therein in which a portion of said lock means extends, said arm being moved into a non-engaging position upon a rotation of said cam means, and said lock means constituting the only means for retaining said cam means from removal from said cavity.

6. In a fastening device, the combination of: walls forming a cavity having an opening through which a fastening pin may extend into said cavity and having an aperture; lock means in said cavity having an arm capable of engaging the fastening pin when same is extended in said cavity; and cam means extending through said aperture and into said cavity, said cam means having a cam groove formed therein through which said arm of said lock means extends, said arm being moved into a non-engaging position upon a rotation of said cam means, and said lock means constituting the only means for retaining said cam means from removal from said cavity.

7. In a fastening device, the combination of: walls forming a cavity having an opening through which a fastening pin may extend into said cavity and having a pair of aligned apertures; lock means in said cavity having an arm capable of engaging the fastening pin when same is extended in said cavity; and cam means, said cam means having bearing portions journaled in said aligned apertures, and said cam means having a cam groove formed therein in which a portion of said lock means extends, said arm being moved into a non-engaging position upon a rotation of said cam means, and said lock means constituting the only means for retaining said cam means from removal from said cavity through one of said apertures.

8. In a fastening device, the combination of: a wall having an opening through which a fastening pin may be extended, and an aperture having a cylindrical wall which constitutes a cylindrical bearing; a spring means secured to said wall and having an arm which is engageable with a fastening pin which may be extended through said opening; and a cam member having a cylindrical journal portion which is journaled in said aperture by said cylindrical bearing, and having a cam portion provided with a groove through which said arm extends for retaining said cam member in place in said aperture, and having a cam face in the bottom of said groove whereby upon a rotation of said cam member said arm may be moved into non-engaging position.

9. In a fastening device, the combination of: a wall having an opening through which a fastening pin may be extended, and an aperture having a cylindrical wall which constitutes a cylindrical bearing; a spring means secured to said wall and having an arm which is engageable with a fastening pin which may be extended through said opening; and a cam member having a cylindrical journal portion which is journaled in said aperture by said cylindrical bearing, and having a cam portion provided with a groove through which said arm extends for retaining said cam member in place in said aperture, said spring means constituting the only means for holding said cam member in place, and having a cam face in the bottom of said groove whereby upon a rotation of said cam member said arm may be moved into non-engaging position.

In testimony whereof, I have hereunto set my hand at Santa Monica, California, this 5th day of June, 1930.

ROBERT ANDERSON.